Patented Aug. 4, 1925.

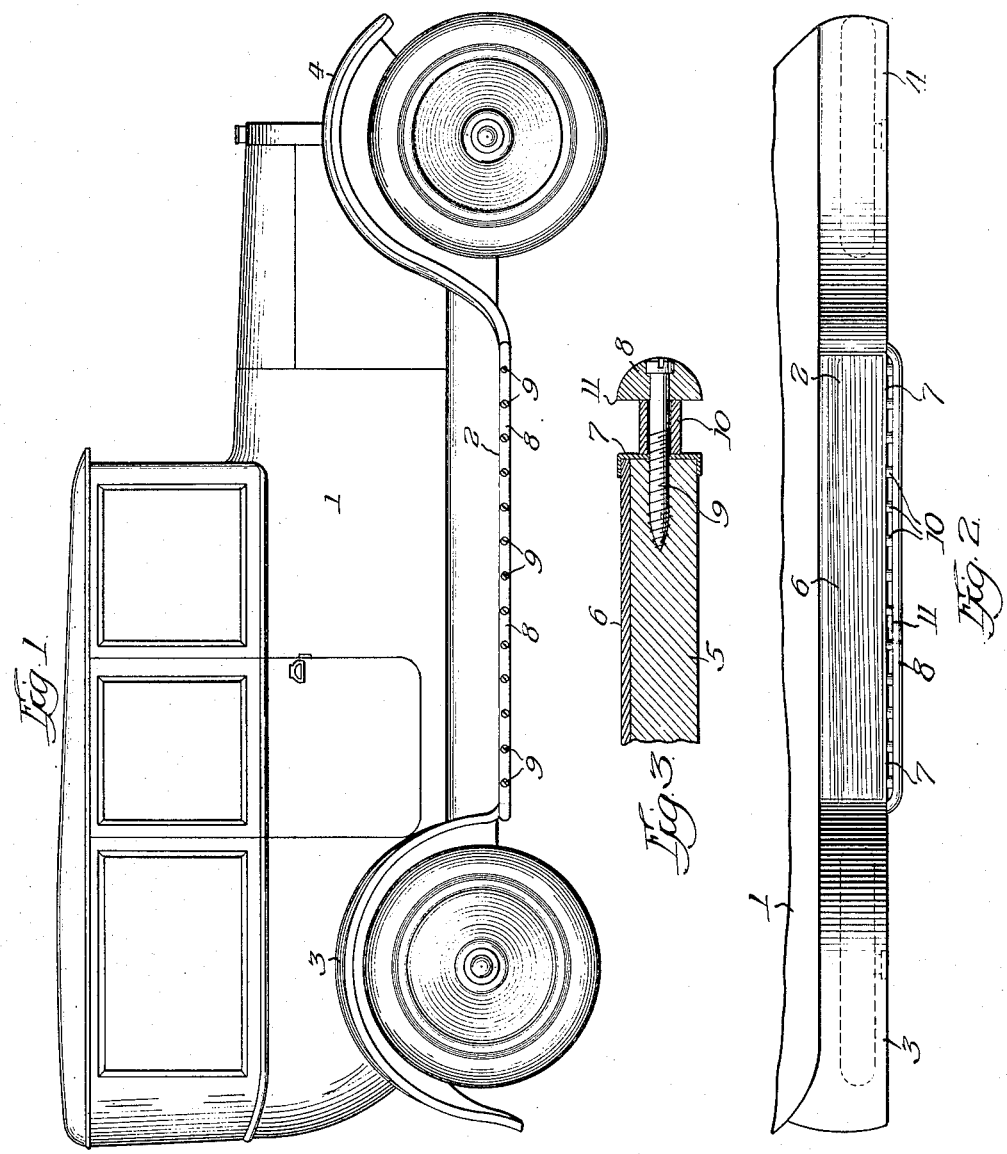

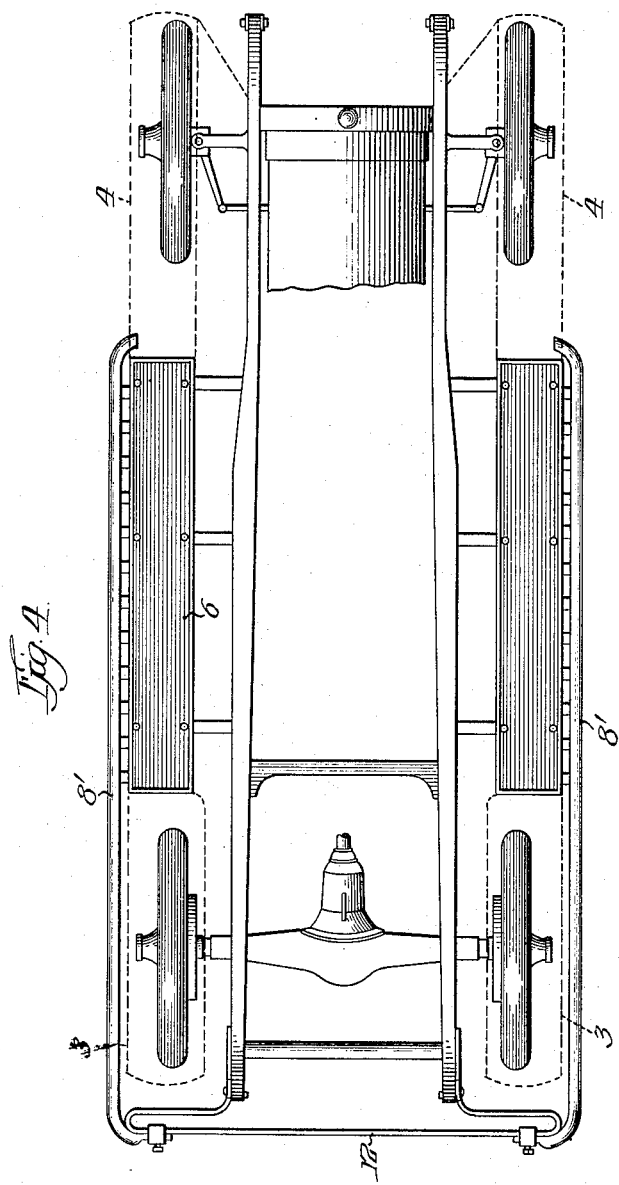

1,548,323

UNITED STATES PATENT OFFICE

WEBB JAY, OF CHICAGO, ILLINOIS.

PROTECTIVE MEANS FOR MOTOR CARS.

Application filed November 10, 1923. Serial No. 673,889.

*To all whom it may concern:*

Be it known that I, WEBB JAY, a citizen of the United States, residing at Chicago, in the county of Cook and State of Illinois, have invented certain new and useful Improvements in Protective Means for Motor Cars, of which the following is a specification.

The present invention relates to protective means for motor cars.

The side trim along the side edges of the running boards of a motor car is usually of flimsy material and is frequently disfigured and frequently permits breaking of the running board when said running board is jammed, even slightly, against an obstacle. Such accidents are quite common when cars are being driven by other than experienced drivers, particularly when the car is being backed in and out of a garage, or in and out of any cramped space. Disfiguring dents are common, not only in the running board, but on the rear fenders as well. The present invention contemplates means for minimizing the danger of suffering such disfigurements.

An object of the present invention is to provide a protective means for motor cars whereby to shield a motor car from injury when the side of said car is jammed against an obstacle.

A further object is to provide a combined protective means and foot scraper which may be readily applied to any cars now in service and which will present a neat appearance.

Further objects will appear as the description proceeds.

Figure 1 is a side view of a motor car having an embodiment of the present invention applied thereto.

Figure 2 is a plan view illustrating a part of a motor car showing an embodiment of the present invention.

Figure 3 is a detail view showing, in section, how the improved protective means is applied to the running board of a motor car.

Figure 4 is a plan view of a motor car chassis showing a modified embodiment of the present invention applied thereto, in which embodiment the rear fenders, as well as the running board, are protected against shocks due to the striking of obstacles sideways of the car.

Motor car 1 has the running board 2, which is mounted between the rear fender 3 and the front fender 4. The running board may comprise the usual wood member 5 with a covering 6 of linoleum or other suitable material. The running board is usually provided with a facing or trim 7 which holds the outer edge of the linoleum into contact with the wood member 5. Arranged along the side of the running board is the protective member 8 which is securely fastened to the wood member 5 by means of screws 9. Spacers 10 are mounted between the protective member 8 and the facing 7 for holding said protective member 8 at a short distance from said facing 7. Said spacers 10 may be in the form of washers surrounding the screws 9, whereby open spaces are provided between the protective member 8 and facing 7. The protective member 8 may present a more or less sharp edge 11 on its upper side whereby to provide a foot scraper. Persons entering the car may scrape the mud from the bottom of their feet by means of the member 8, thereby avoiding tracking of the mud into the car. Said mud will drop through the spaces provided between the member 8 and the facing 7.

The protective member 8 may be of steel, wrought iron, or any other material providing the requisite strength and toughness to withstand the shocks which are commonly sustained by the running board when said running board is jammed laterally against obstacles.

According to the modification disclosed in Figure 4, a protective member 8' is mounted along the outer side edge of each of the running boards and is continued rearwardly beyond the rear fenders. According to the disclosure in Figure 4, the car is provided with a rear bumper 12 which may be fastened to the chassis in any preferred manner. Each of the protective members 8'—8' is fastened at its forward end to the side of its corresponding running board or other part of the frame and at its rear end to said rear bumper 12. Said members 8'—8' therefore constitute means for protecting the fenders against lateral blows. It will be understood, of course, that the members 8'—8' may be fastened in any other preferred way at their rear extremities whereby to provide the necessary resistance to lateral stresses.

The illustrated embodiments of the present invention have been disclosed merely for the purpose of illustration and should not be considered in a limiting sense. Many modifications will occur to those skilled in the art. It is intended in this patent to cover all such modifications that fall within the scope of the invention as defined by the appended claims.

I claim:

1. In combination, the frame of an automobile including a running board, a stiff metal guard mounted upon the outer edge of said running board and means for holding said guard in spaced relation to said outer edge.

2. In combination, the frame of an automobile, including a running board, a protective guard comprising a stiff metal member extending along said running board, said guard being mounted upon the outer edge of said running board and connected to said automobile frame at the rear thereof.

3. In combination in a motor car, a running board, a rear fender, a protective guard mounted upon the outer edge of said running board and extending longitudinally of said car in a position to protect said running board and fender, said guard being connected at both of its ends to said motor car.

4. In combination in a motor car, a running board, a rear fender, a protective guard mounted upon the outer edge of said running board and extending longitudinally of said car in a position to protect said running board and fender, said guard being connected at both of its ends to said motor car, said guard being slightly spaced from said running board and providing a scraper edge, whereby to constitute a foot scraper.

5. In combination, the running board of an automobile, a combined guard and foot scraper connected thereto, said guard comprising a stiff metallic member mounted upon the outer edge of said running board and extending longitudinally of said running board, spaced holding means for said guard and spacers surrounding said holding means for holding said guard in spaced relation to said running board.

6. In combination, the frame of an automobile including a running board, a protective guard comprising a stiff metal member extending along said running board, said guard being connected to said automobile frame at the rear thereof, said metal member being provided with a scraper edge, and means for spacing said metal member from said running board.

7. In combination, the frame of an automobile including a running board, a rear bumper, a stiff metal guard mounted upon the outer edge of said running board, and means for rigidly connecting said guard to said running board and to said rear bumper.

8. In combination, the frame of an automobile including a running board, a rear bumper, a stiff metal guard mounted upon the outer edge of said running board, means for holding said guard in spaced relation to said outer edge, and means for rigidly connecting said guard to said rear bumper.

9. In combination, the frame of an automobile including a running board, a rear fender, a rear bumper, a stiff metal guard mounted upon the outer edge of said running board and extending rearwardly of said running board outside of said rear fender, and means for holding said guard upon said running board and to said rear bumper.

Signed at Chicago, Illinois, this 2nd day of November, 1923.

WEBB JAY.